(12) United States Patent
Akasaka et al.

(10) Patent No.: US 7,352,973 B1
(45) Date of Patent: Apr. 1, 2008

(54) ADDING WAVELENGTHS TO AN OPTICAL COMMUNICATION NETWORK

(75) Inventors: Youichi Akasaka, Foster City, CA (US); Ian M. White, Mountain View, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 699 days.

(21) Appl. No.: 10/865,197

(22) Filed: Jun. 10, 2004

(51) Int. Cl.
*H04B 10/16* (2006.01)
(52) U.S. Cl. .................................... 398/175
(58) Field of Classification Search ............... 398/97, 398/175
See application file for complete search history.

(56) References Cited

U.S. PATENT DOCUMENTS

2007/0009261 A1* 1/2007 Nielsen .................. 398/45

* cited by examiner

*Primary Examiner*—Shi K Li

(57) ABSTRACT

A method for adding a new wavelength to an optical communication network is provided. One step of the method includes installing a transmitter component in a transmitter node of the optical communication network. Another step includes installing a receiver component in a receiver node of the optical communication network. For each of a plurality of regenerator nodes in the optical communication network, the method includes the steps of determining whether the quality of optical signals for the new wavelength at the particular regenerator node satisfies a performance threshold, installing an optical regenerator component in the regenerator node for regenerating the optical signals if the quality of the optical signals at the regenerator node satisfies the performance threshold, and installing optical-to-electrical-to-optical regenerator components if the quality of the optical signals at the regenerator node does not satisfy the performance threshold.

15 Claims, 11 Drawing Sheets

US 7,352,973 B1

ADDING WAVELENGTHS TO AN OPTICAL COMMUNICATION NETWORK

BACKGROUND OF THE INVENTION

1. Field of the Invention

The invention is related to the field of communication networks, and in particular, to adding wavelengths to optical communication networks using optical regenerator components.

2. Statement of the Problem

Many communication companies use fiber optic cabling as a media for transmitting data because of its high-bandwidth capacity. Fiber optic cables of an optical communication network can reliably transport optical signals over long distances. Over a long distance, the optical signals attenuate in the optical fiber. Consequently, long haul and ultra-long haul optical communication networks need regenerator nodes every 200 km to 500 km to regenerate the optical signals in order to provide a quality optical signal at the receiver end.

Current regenerator nodes regenerate optical signals in the electrical domain. An optical-to-electrical line card in the regenerator node receives optical signals from a fiber span and converts the optical signals into electrical signals. An amplifier amplifies or otherwise regenerates the electrical signals and transmits the regenerated electrical signals to an electrical-to-optical line card. The electrical-to-optical line card converts the regenerated electrical signals into optical signals and transmits the optical signals over a fiber span. The same process takes place in each regenerator node until the optical signals reach the receiver end.

As communication demands rise in the areas served by an optical communication network, the optical communication network may have to be upgraded to increase the capacity. One way to upgrade the capacity of the optical communication network is to add one or more wavelengths to the optical communication network. Traditionally, a wavelength is added to an optical communication network by installing components for the new wavelength that are similar to the components used to implement the current wavelengths. For instance, to add a wavelength to the optical communication network discussed above, network technicians would add an optical-to-electrical line card, an electrical-to-optical line card, and possibly an amplifier to each regenerator node.

One problem with adding new wavelengths in this manner is that it is expensive. Regenerator line cards require high-speed electronics that are difficult and expensive to engineer. Currently, optical-to-electrical line cards and electrical-to-optical line cards each cost about $50,000. If a regenerator node is needed every 200 km to 500 km, the cost of adding a new wavelength to an ultra-long haul optical communication network can quickly rise.

SUMMARY OF THE SOLUTION

The invention helps solve the above and other problems by adding wavelengths to an optical communication network using optical regenerator components wherever possible. The optical regenerator components regenerate optical signals in the optical domain instead of the electrical domain. Each regenerator node would only need a single optical regenerator component rather than an optical-to-electrical line card and an electrical-to-optical line card. The optical regenerator components are less expensive than optical-to-electrical line cards and electrical-to-optical line cards, which makes adding wavelengths less expensive than could previously be accomplished.

One embodiment of the invention is a method for adding a new wavelength to an optical communication network. One step of the method includes installing a transmitter component in a transmitter node of the optical communication network. Another step of the method includes installing a receiver component in a receiver node of the optical communication network. For each of a plurality of regenerator nodes in the optical communication network, the following steps occur. One step includes determining whether the quality of optical signals for the new wavelength at the particular regenerator node satisfies a performance threshold. If the quality of the optical signals for the new wavelength at the regenerator node satisfies the performance threshold, then another step includes installing an optical regenerator component in the regenerator node for regenerating the optical signals. The optical regenerator component regenerates the optical signals in the optical domain. If the quality of the optical signals for the new wavelength at the regenerator node does not satisfy the performance threshold, then another step includes installing optical-to-electrical-to-optical regenerator components in the regenerator node for regenerating the optical signals.

The invention may include other embodiments described below.

DESCRIPTION OF THE DRAWINGS

The same reference number represents the same element on all drawings.

DETAILED DESCRIPTION OF THE INVENTION

Figure 1:
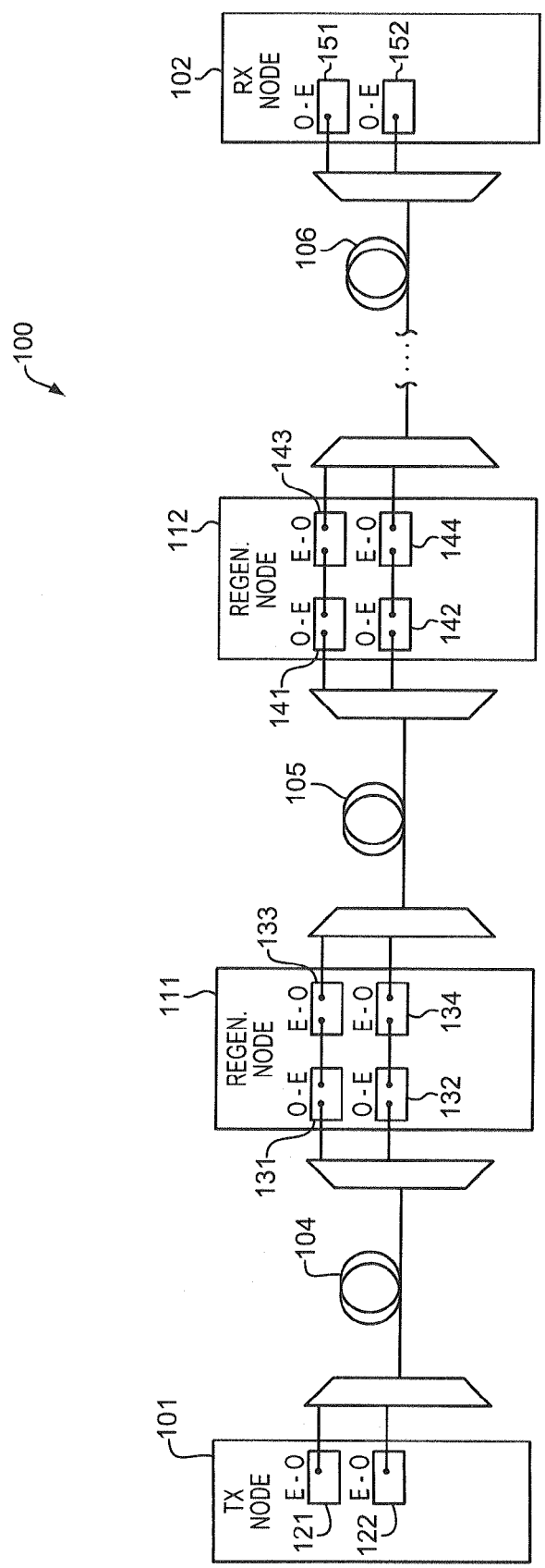
FIG. 1 illustrates an optical communication network in the prior art.
Figure 2:
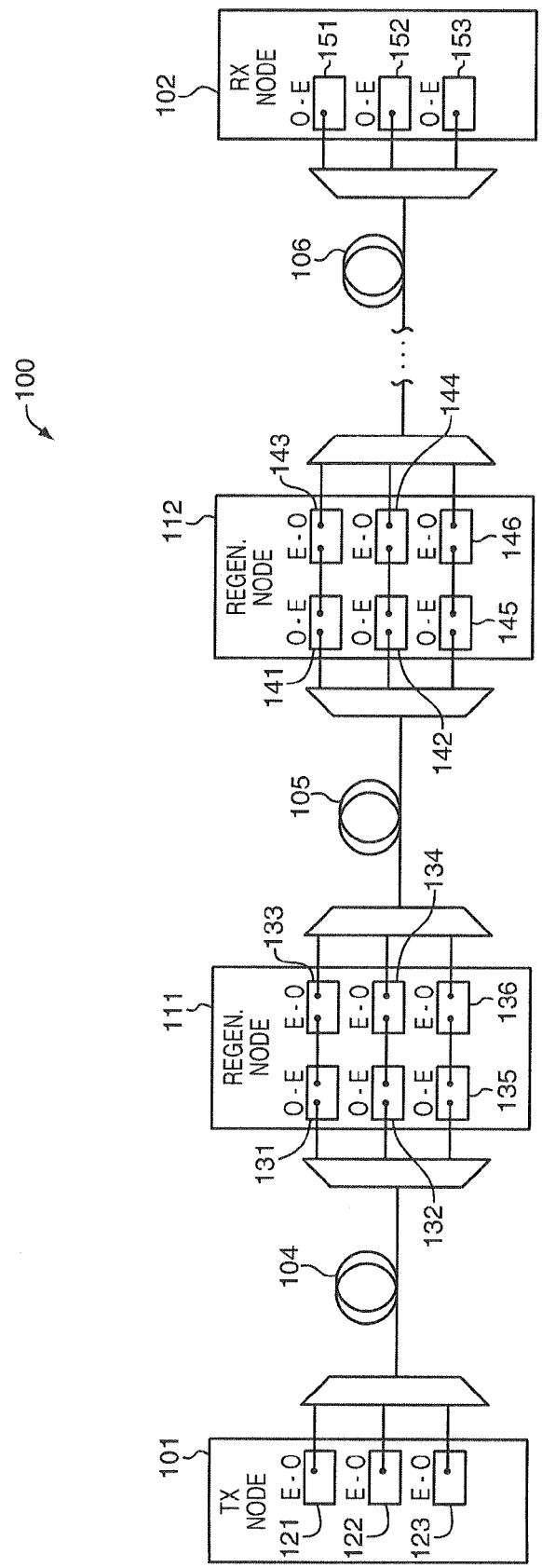
FIG. 2 illustrates the optical communication network of FIG. 1 with a new wavelength added in the prior art.

In order to better describe the invention, the following description includes a discussion of the prior art in FIGS. 1-2 followed by the discussion of the invention in FIGS. 3-11.

Prior Art Optical Communication Network

FIGS. 1-2

FIG. 1 illustrates an optical communication network 100 in the prior art. Optical communication network 100 includes a transmitter node 101, regenerator nodes 111-112, and a receiver node 102. Transmitter node 101 is coupled to regenerator node 111 by a fiber span 104. Regenerator node 111 is coupled to regenerator node 112 by a fiber span 105. Receiver node 102 is coupled to regenerator node 112 or another regenerator node not shown in FIG. 1 by a fiber span 106.

Transmitter node 101 includes electrical-to-optical components 121-122 that transmit optical signals over fiber span 104. Component 121 corresponds to a first wavelength in optical communication network 100 and component 122 corresponds to a second wavelength. Regenerator node 111 includes optical-to-electrical components 131-132 and electrical-to-optical components 133-134 that regenerate optical signals received over fiber span 104. Components 131 and 133 correspond to the first wavelength in optical communication network 100 and components 132 and 134 correspond to the second wavelength. Regenerator node 112 includes optical-to-electrical components 141-142 and electrical-to-optical components 143-144 that regenerate optical signals received over fiber span 105. Components 141 and 143 correspond to the first wavelength in optical communication network 100 and components 142 and 144 correspond to the second wavelength. Receiver node 102 includes optical-to-electrical components 151-152 that receive optical signals from fiber span 106. Component 151 corresponds to the first wavelength in optical communication network 100 and component 152 corresponds to the second wavelength.

Optical communication network 100 has two wavelengths for transporting voice and data. As communication demands rise in the areas served by optical communication network 100, optical communication network 100 may have to be upgraded to increase the capacity. One way to upgrade the capacity of optical communication network 100 is to add a wavelength to optical communication network 100. To add a wavelength to optical communication network 100, components for the new wavelength are installed that are similar to the components used to implement the first two wavelengths.

FIG. 2 illustrates optical communication network 100 with a new wavelength added in the prior art. To add a new wavelength, an electrical-to-optical component 123, similar to components 121-122, is installed in transmitter node 101 to transmit optical signals for the new wavelength. An optical-to-electrical component 135, similar to components 131-132, and an electrical-to-optical component 136, similar to components 133-134, are installed in regenerator node 111 to regenerate the optical signals for the new wavelength. An optical-to-electrical component 145, similar to components 141-142, and an electrical-to-optical component 146, similar to components 143-144, are installed in regenerator node 112 to regenerate the optical signals for the new wavelength. An optical-to-electrical component 153, similar to components 151-152, is installed in receiver node 102 to receive the optical signals for the new wavelength.

One problem with adding a new wavelength in this manner is that it is expensive. The traditional optical-to-electrical components and the electrical-to-optical components may each cost about $50,000. At each regenerator node, both an optical-to-electrical component and an electrical-to-optical component are needed. If a regenerator node is needed every 200 km to 500 km, the cost of adding a new wavelength to an ultra-long haul communication network can quickly rise.

Description of the Invention

FIGS. 3-11

FIGS. 3-11 and the following description depict specific embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to these specific embodiments described below, but only by the claims and their equivalents.

Figure 3:
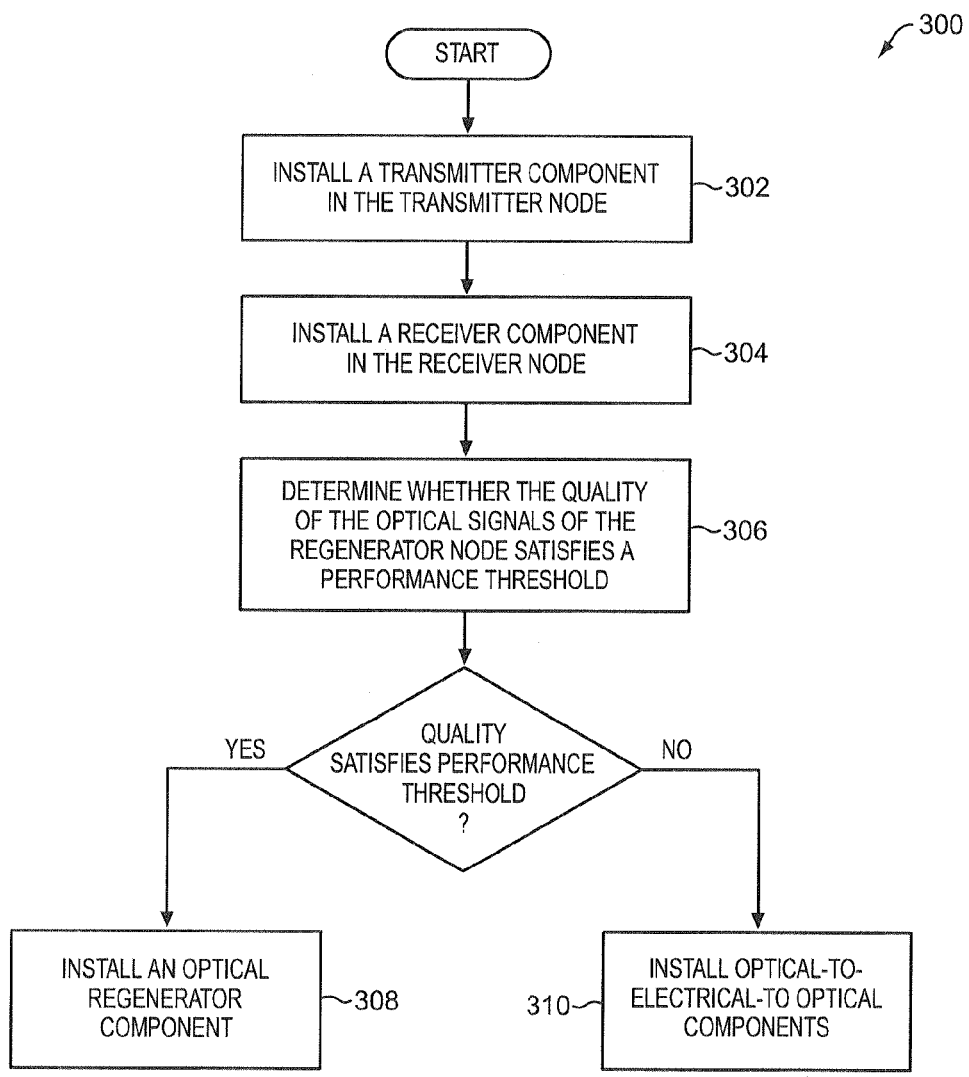
FIG. 3 is a flow chart illustrating a method of adding a new wavelength to an optical communication network in an embodiment of the invention.

FIG. 3 is a flow chart illustrating a method 300 of adding a new wavelength to an optical communication network in an embodiment of the invention. Method 300 may be performed on any optical communication network comprising a transmitter node, a plurality of regenerator nodes, and a receiver node. Method 300 may include other steps than those illustrated in FIG. 3.

For method 300, step 302 includes installing a transmitter component in the transmitter node. The transmitter component comprises any component, device, or system configured to transmit optical signals for a wavelength. One example of a transmitter component comprises a Small Form Factor (SFF) transceiver. Step 304 includes installing a receiver component in the receiver node. The receiver component comprises any component, device, or system configured to receive optical signals for a wavelength. For each of the plurality of regenerator nodes in the optical communication network, the following steps are performed. Step 306 includes determining whether the quality of the optical signals for the new wavelength at the particular regenerator node satisfies a performance threshold. The quality of the optical signals may depend on many factors, such as the noise present on the optical signals, the signal-to-noise ratio for the optical signals, the shape of the optical signals, etc. The quality of the optical signals may be determined responsive to the transmitter component transmitting the optical signals for the new wavelength over a fiber span coupled to the regenerator node. In other embodiments, test equipment in the transmitter node may be used to transmit optical signals for the new wavelength over the fiber span.

If the quality of the optical signals for the new wavelength at the regenerator node satisfies the performance threshold, then step 308 includes installing an optical regenerator component in the regenerator node for regenerating the optical signals. An optical regenerator component comprises any component, device, or system that regenerates, reshapes, re-amplifies, recovers, etc, optical signals in the optical domain (instead of the electrical domain). The optical regenerator component may comprise a 2R regenerator component, a 3R regenerator component, a Semiconductor Optical Amplifier (SOA)-based Mach-Zehnder Interferometer (MZI) wavelength converter, an SOA-based MZI wavelength converter that uses a tunable laser source, a Mach-Zehnder cross gain modulation device, etc.

If the quality of the optical signals for the new wavelength at the regenerator node does not satisfy the performance threshold, then step 310 includes installing optical-to-electrical-to-optical regenerator components in the regenerator node for regenerating the optical signals. Optical-to-electrical-to-optical regenerator components comprises any components, devices, or systems that regenerate, reshape, re-amplify, recover, etc, optical signals in the electrical domain. Optical-to-electrical-to-optical regenerator components may include traditional optical-to-electrical line cards and electrical-to-optical line cards.

Figure 4:
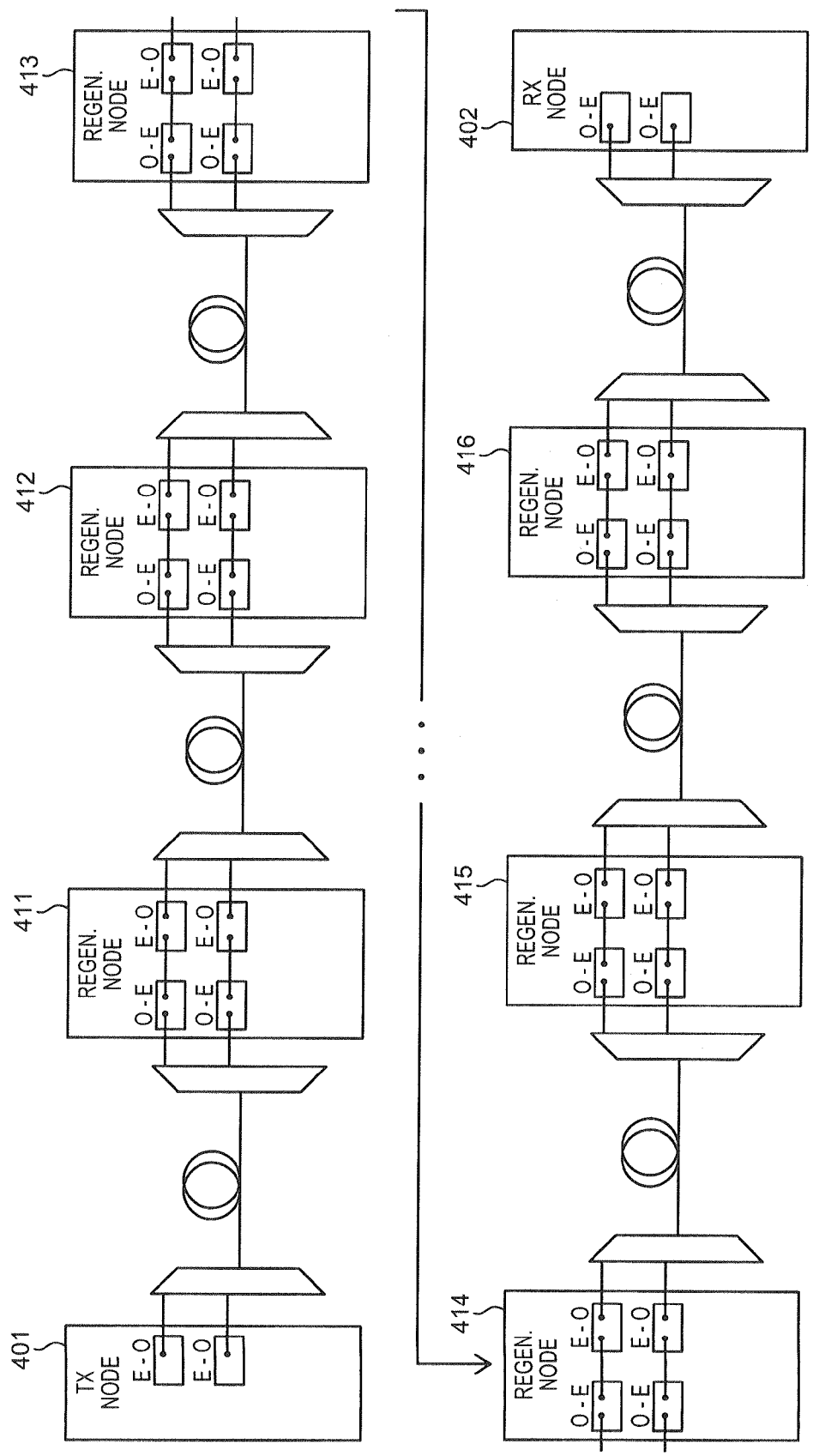
FIG. 4 illustrates an optical communication network in an embodiment of the invention.

FIG. 4 illustrates an optical communication network 400 in an embodiment of the invention. Optical communication network 400 includes a transmitter node 401, a plurality of regenerator nodes 411-416, and a receiver node 402. Optical communication network 400 comprises an ultra-long haul network in this embodiment. For instance, optical communication network 400 may comprise a network between California and Illinois. In other embodiments, optical communication network 400 may comprise a long haul network.

Optical communication network 400 also comprises a Dense Wavelength Division Multiplexing (DWDM) network, a Course Wavelength Division Multiplexing (CWDM) network, or another type of multiplexed network. The legacy equipment illustrated in FIG. 4 provides two wavelengths for transporting voice and/or data. If more capacity is desired from optical communication network 400, then one or more wavelengths may be added. Method 300 in FIG. 3 may used to add a new wavelength as is described below.

Figure 5:
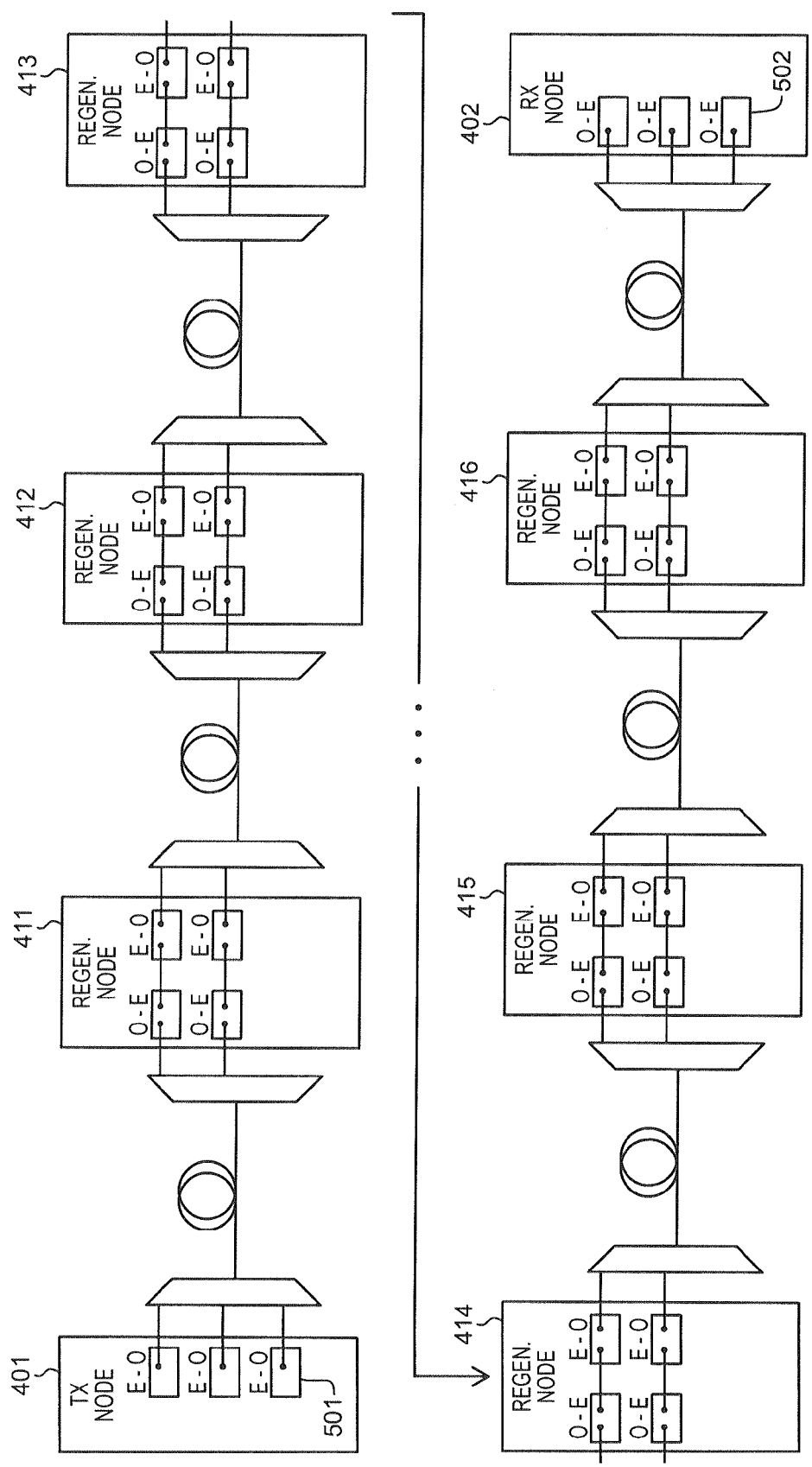
FIG. 5 illustrates the optical communication network of FIG. 4 with a transmitter component and a receiver component installed in an embodiment of the invention.

In step 302 of FIG. 3, a network technician installs a transmitter component 501 in the transmitter node 401. In step 304, the network technician installs a receiver component 502 in the receiver node 402. FIG. 5 illustrates optical communication network 400 with the transmitter component 501 and the receiver component 502 installed. Transmitter component 501 and receiver component 502 do not have to be installed in any particular order or installed before regenerator components. Transmitter component 501 comprises a traditional electrical-to-optical line card in this embodiment in order to take advantage of existing inventory. Similarly, receiver component 502 comprises a traditional optical-to-electrical line card in this embodiment in order to take advantage of existing inventory. Transmitter component 501 and receiver component 502 may comprise other types of components in other embodiments.

At the first regenerator node 411, the network technician measures optical signals for the new wavelength using a measurement device. The optical signals may be transmitted by the transmitter component 501 that was previously installed, or may be transmitted by test equipment installed by the network technician to transmit optical signals at the new wavelength. According to step 306 of FIG. 3, the network technician determines whether the quality of the optical signals at regenerator node 411 satisfies a performance threshold. The network technician will expect a desired level of quality of the optical signals. The network technician may look at the noise present on the optical signals, the signal-to-noise ratio for the optical signals, the shape of the optical signals, etc.

Figure 6:
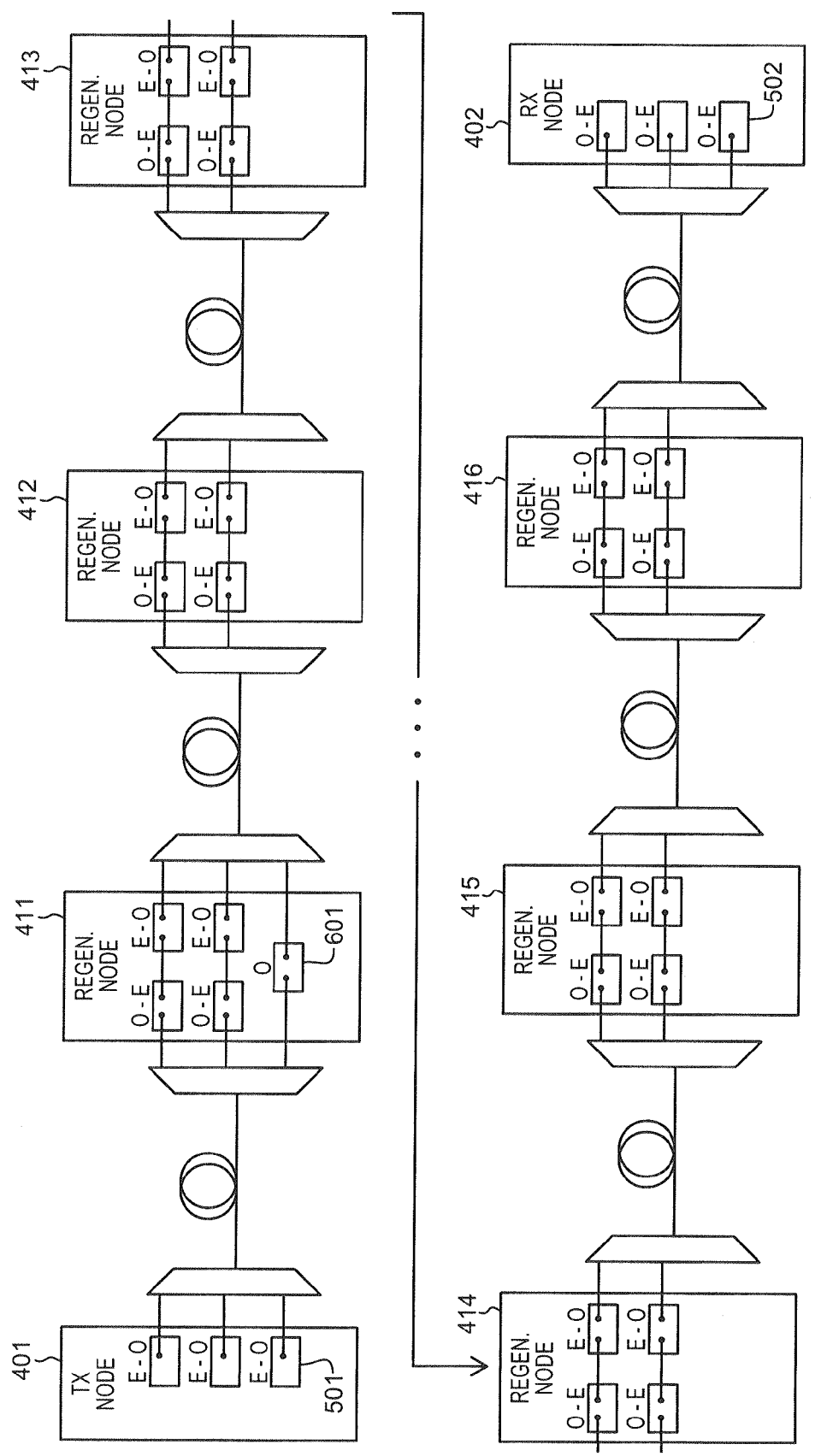
FIGS. 6-11 illustrate the optical communication network of FIG. 5 with regenerator components installed in an embodiment of the invention.

Assume that the quality of the optical signals at regenerator node 411 satisfies the performance threshold. The goal of method 300 is to install all-optical regenerator components wherever possible because they are less expensive than traditional optical-to-electrical and electrical-to-line cards. For instance, an all-optical regenerator component costs $20,000 or less whereas an optical-to-electrical line card or an electrical-to-optical line card costs $50,000 or more. Because the quality of the optical signals at regenerator node 411 satisfies the performance threshold, the network technician installs an all-optical regenerator component in regenerator node 411 for the new wavelength. FIG. 6 illustrates optical communication network 400 with an all-optical regenerator component 601 installed in regenerator node 411. Regenerator component 601 is configured to regenerate the optical signals received in regenerator node 411 in the optical domain.

Figure 7:
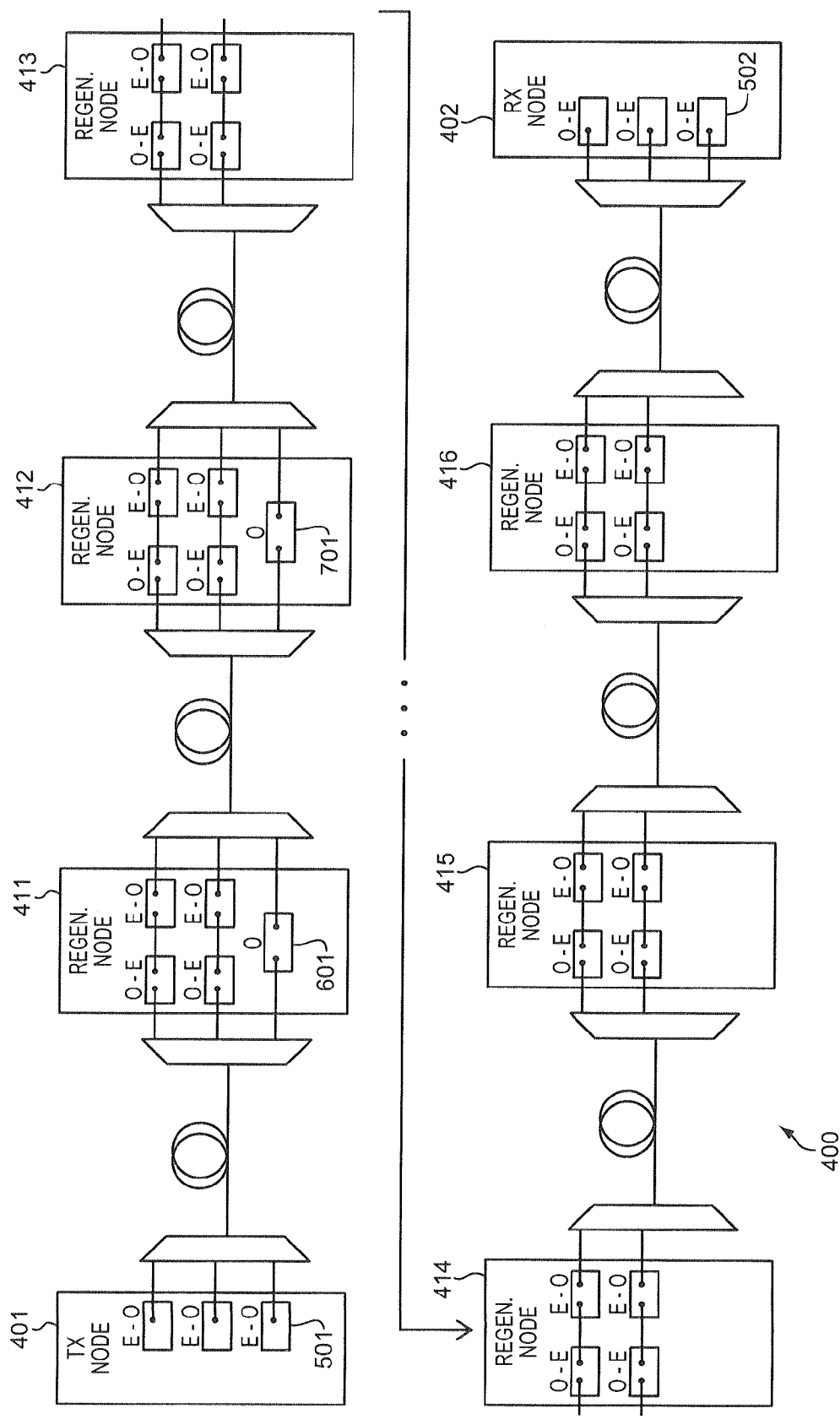

At the second regenerator node 412, the network technician determines whether the quality of the optical signals satisfies the performance threshold. Assume that the quality of the optical signals at regenerator node 412 satisfies the performance threshold. Because the quality satisfies the performance threshold, the network technician installs an all-optical regenerator component in regenerator node 412 for the new wavelength. FIG. 7 illustrates optical communication network 400 with an all-optical regenerator component 701 installed in regenerator node 412. Regenerator component 701 is configured to regenerate the optical signals received in regenerator node 412 in the optical domain.

Figure 8:
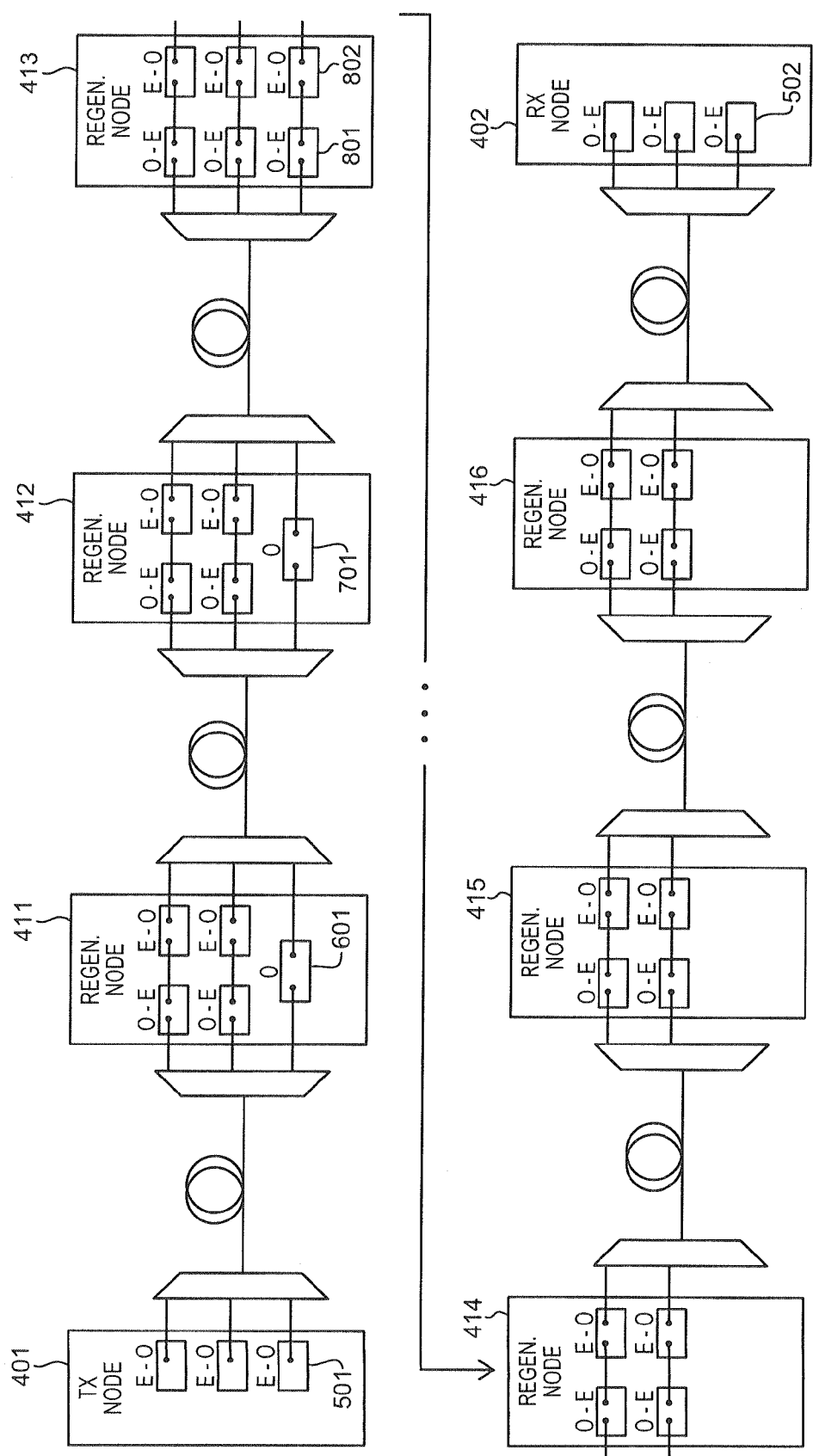

At the third regenerator node 413, the network technician determines whether the quality of the optical signals at regenerator node 413 satisfies the performance threshold. Assume now that the quality of the optical signals at regenerator node 413 does not satisfy the performance threshold. Over the distance between the transmitter node 401 and regenerator node 413, the quality of the optical signals may have diminished such that an all-optical regenerator component may not be sufficient to regenerate the optical signals. To properly regenerate the optical signals, the optical signals need to be converted to electrical format. Therefore, the network technician installs optical-to-electrical-to-optical regenerator components in regenerator node 413 for the new wavelength. The optical-to-electrical-to-optical regenerator components for the new wavelength are similar to the ones used for the other wavelengths in regenerator node 413. FIG. 8 illustrates optical communication network 400 with optical-to-electrical-to-optical regenerator components 801-802 installed in regenerator node 413. Regenerator components 801-802 are configured to convert the optical signals received in regenerator node 413 to electrical signals, regenerate the electrical signals in the electrical domain, and then convert the electrical signals back to optical signals.

Figure 9:
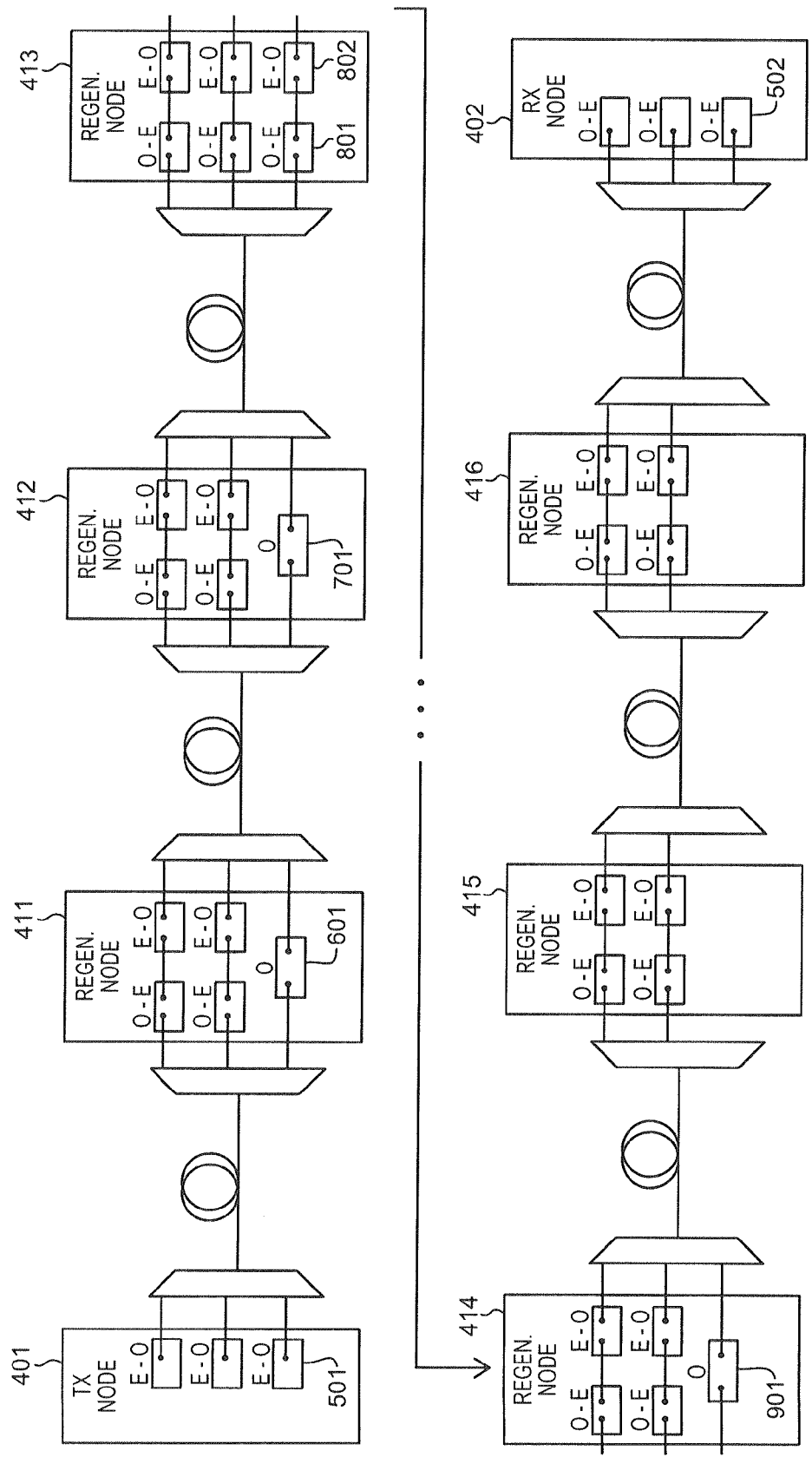

At the fourth regenerator node 414, the network technician determines whether the quality of the optical signals at regenerator node 414 satisfies the performance threshold. Assume that the quality satisfies the performance threshold. Because the quality of the optical signals at regenerator node 414 satisfies the performance threshold, the network technician installs an all-optical regenerator component in regenerator node 414 for the new wavelength. FIG. 9 illustrates optical communication network 400 with an all-optical regenerator component 901 installed in regenerator node 414. Regenerator component 901 is configured to regenerate the optical signals received in regenerator node 414 in the optical domain.

Figure 10:
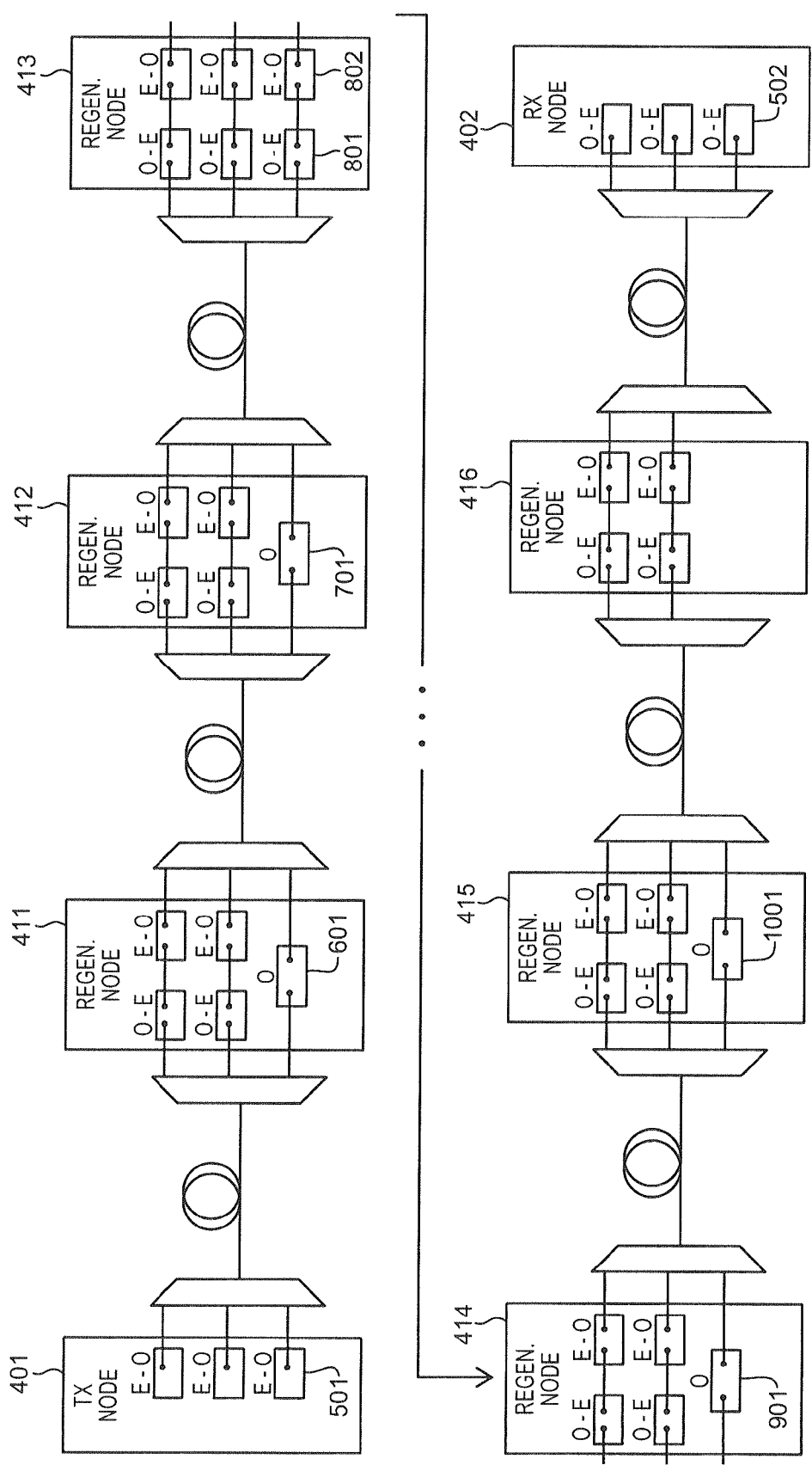

At the fifth regenerator node 415, the network technician determines whether the quality of the optical signals at regenerator node 415 satisfies the performance threshold. Assume that the quality of the optical signals at regenerator node 415 satisfies the performance threshold. Because the quality satisfies the performance threshold, the network technician installs an all-optical regenerator component in regenerator node 415 for the new wavelength. FIG. 10 illustrates optical communication network 400 with an all-optical regenerator component 1001 installed in regenerator node 415. Regenerator component 1001 is configured to regenerate the optical signals received in regenerator node 415 in the optical domain.

Figure 11:
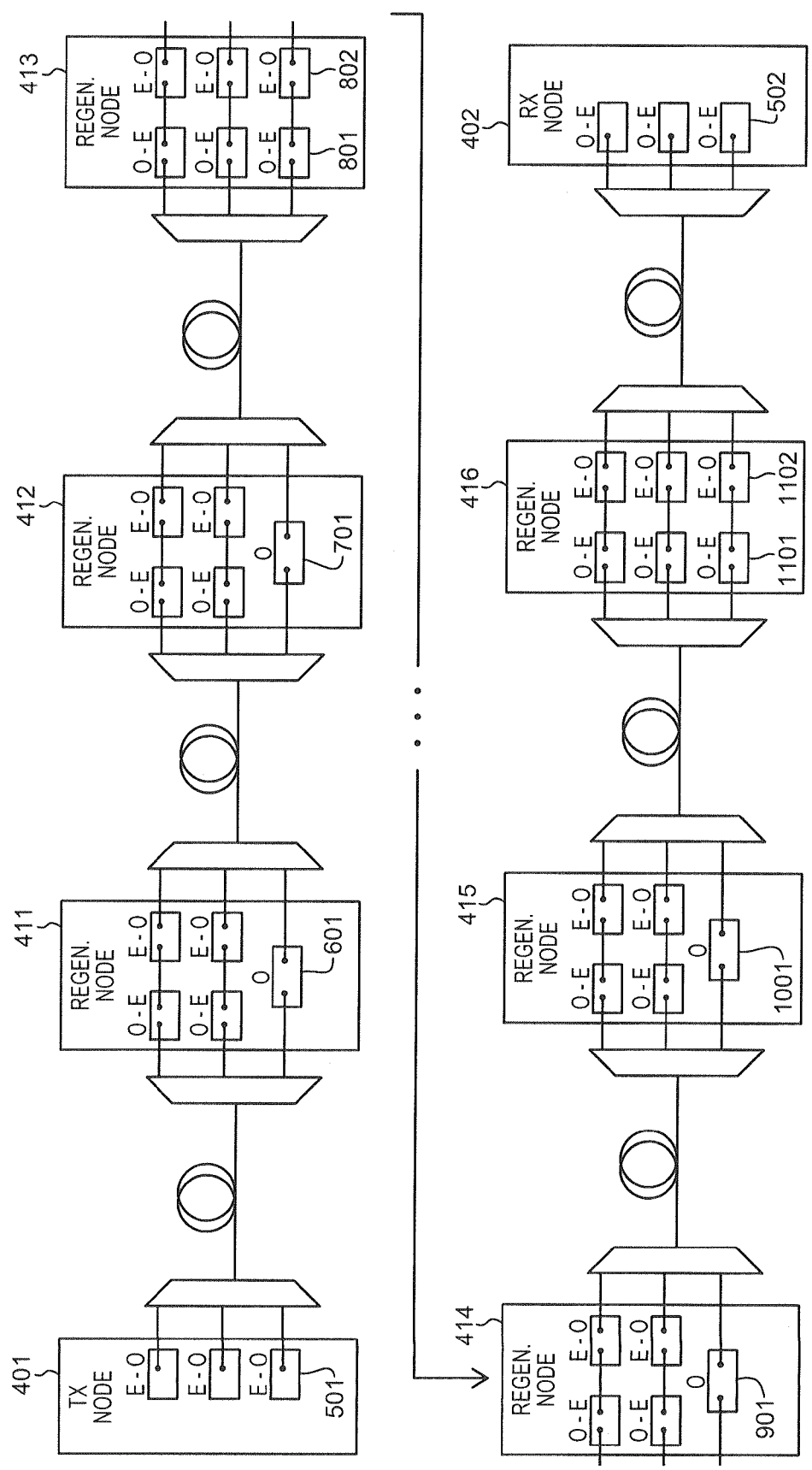

At the sixth regenerator node 416, the network technician determines whether the quality of the optical signals at regenerator node 416 satisfies the performance threshold. Assume again that the quality of the optical signals at regenerator node 416 does not satisfy the performance threshold. To properly regenerate the optical signals, the optical signals need to be converted to electrical format. Therefore, the network technician installs optical-to-electrical-to-optical regenerator components in regenerator node 416 for the new wavelength. The optical-to-electrical-to-optical regenerator components for the new wavelength are similar to the ones used for the other wavelengths in regenerator node 416. FIG. 11 illustrates optical communication network 400 with optical-to-electrical-to-optical regenerator components 1101-1102 installed in regenerator node 416. Regenerator components 1101-1102 are configured to convert the optical signals received in regenerator node 416 to electrical signals, regenerate the electrical signals in the electrical domain, and then convert the electrical signals back to optical signals.

Before measuring the optical signals at each regenerator node, the network technician may perform some initial calculations to estimate where all-optical regenerator components can be installed. That way, the network technician may avoid having to measure the optical signals at each node. For instance, the first regenerator node 411 may be 150 km from the transmitter node 401. The network technician can estimate that the quality of the optical signals at the first regenerator node 411 will satisfy the performance threshold, and install an all-optical regenerator node. The network technician may not have to start measuring the optical signals until the second regenerator node, the third regenerator node, the fourth regenerator node, etc.

In FIG. 11, the components required to operate the new wavelength are installed. Advantageously, the new wavelength may be added in a more cost effective manner using method 300. For instance, assume each traditional line card costs $50,000. For a prior installation of a new wavelength, each regenerator node would need two line cards (e.g., an optical-to-electrical line card and an electrical-to-optical line card) for a cost of $100,000 per regenerator node. For the optical communication network 400 shown in FIG. 11 having six regenerator nodes, a prior installation of a new wavelength would cost about $600,000 ($100,000 per regenerator node for 6 nodes), without counting the cost of the transmitter and receiver components.

Due to method 300 of adding a new wavelength as shown in FIG. 11, four regenerator nodes 411-412, 414-415 were installed with all-optical regenerator components. Assume each all-optical regenerator component costs $20,000. Two regenerator nodes 413, 416 were installed with traditional line cards for a cost of $100,000 for each regenerator node. Therefore, the total cost of the installation of the new wavelength would be about $280,000. The cost reduction in adding wavelengths according to method 300 allows service providers to provide higher capacity to their users in a more cost effective manner.

Steps 306-310 in FIG. 3 may be used to change legacy systems in addition to adding new wavelengths. For instance, a network technician may determine whether the quality of the optical signals at a regenerator node satisfies a performance threshold, and switch out optical-to-electrical-to-optical regenerator components with an all-optical regenerator component if the quality of the optical signals at the regenerator node satisfies the performance threshold. The optical-to-electrical-to-optical regenerator components that were switched out may be returned to inventory or used to add new wavelengths. Using steps 306-310, network technicians may strategically replace legacy regenerator components with new all-optical regenerator components.

What is claimed is:

1. A method of adding a new wavelength to an optical communication network, the optical communication network comprising a transmitter node, a plurality of regenerator nodes, and a receiver node, the method comprising the steps of:

installing a transmitter component in the transmitter node for the new wavelength;

installing a receiver component in the receiver node for the new wavelength; and for each of the plurality of regenerator nodes in the optical communication network, determining whether a quality of optical signals for the new wavelength at the regenerator node satisfies a performance threshold responsive to receiving the optical signals over a fiber span coupled to the regenerator node;

installing an optical regenerator component in the regenerator node for regenerating the optical signals for the new wavelength if the quality of the optical signals at the regenerator node satisfies the performance threshold; and installing optical-to-electrical-to-optical regenerator components in the regenerator node for regenerating the optical signals for the new wavelength if the quality of the optical signals at the regenerator node does not satisfy the performance threshold.

2. The method of claim 1 further comprising the step of: transmitting the optical signals over the fiber span to the regenerator node using the transmitter component.

3. The method of claim 1 further comprising the step of: transmitting the optical signals over the fiber span to the regenerator node using test equipment.

4. The method of claim 1 wherein the step of determining whether a quality of optical signals for the new wavelength at the regenerator node satisfies a performance threshold comprises:

determining whether the noise present on the optical signals satisfies the performance threshold.

5. The method of claim 1 wherein the step of determining whether a quality of optical signals for the new wavelength at the regenerator node satisfies a performance threshold comprises:

determining whether the signal-to-noise ratio for the optical signals satisfies the performance threshold.

6. The method of claim 1 wherein the step of determining whether a quality of optical signals for the new wavelength at the regenerator node satisfies a performance threshold comprises:

determining whether the shape of the optical signals satisfies the performance threshold.

7. The method of claim 1 wherein the optical regenerator component includes an all-optical 2R regenerator component.

8. The method of claim 1 wherein the optical regenerator component includes an all-optical 3R regenerator component.

9. The method of claim 1 wherein the optical regenerator component includes an SOA-based MZI wavelength converter.

10. The method of claim 9 wherein the SOA-based MZI wavelength converter uses a tunable laser source.

11. The method of claim 1 wherein the optical regenerator component includes a Mach-Zehnder cross gain modulation device.

12. The method of claim 1 wherein the optical communication network comprises a long haul network.

13. The method of claim 1 wherein the optical communication network comprises an ultra-long haul network.

14. The method of claim 1 wherein the optical communication network comprises a dense wavelength division multiplexing (DWDM) network.

15. The method of claim 1 wherein the optical communication network comprises a course wavelength division multiplexing (CWDM) network.

* * * * *